US012625401B2

(12) United States Patent
Tsai

(10) Patent No.: US 12,625,401 B2
(45) Date of Patent: *May 12, 2026

(54) LIGHT DIFFUSION SHEET, BACK-LIGHT UNIT, LIQUID CRYSTAL DISPLAY DEVICE, INFORMATION APPARATUS, AND METHOD FOR MANUFACTURING BACK-LIGHT UNIT

(71) Applicant: KEIWA Incorporated, Tokyo (JP)

(72) Inventor: Chengheng Tsai, Tokyo (JP)

(73) Assignee: KEIWA Incorporated, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/190,288

(22) Filed: Apr. 25, 2025

(65) Prior Publication Data

US 2025/0251626 A1      Aug. 7, 2025

Related U.S. Application Data

(63) Continuation of application No. 18/825,724, filed on Sep. 5, 2024, now Pat. No. 12,313,935, which is a continuation of application No. PCT/JP2022/041405, filed on Nov. 7, 2022.

(30) Foreign Application Priority Data

Mar. 9, 2022      (JP) ................................. 2022-035936

(51) Int. Cl.
*G02F 1/00*      (2006.01)
*G02F 1/13357*      (2006.01)
(52) U.S. Cl.
CPC .. *G02F 1/133606* (2013.01); *G02F 1/133603* (2013.01)

(58) Field of Classification Search
None
See application file for complete search history.

(56) References Cited

U.S. PATENT DOCUMENTS

| | | | |
|---|---|---|---|
| 7,862,192 B2 | 1/2011 | Chang | |
| 11,150,512 B2* | 10/2021 | Tsai | ................. G02F 1/133603 |
| 2005/0088839 A1* | 4/2005 | Huang | .................... H01J 61/35 |
| | | | 362/633 |

(Continued)

FOREIGN PATENT DOCUMENTS

| | | |
|---|---|---|
| CN | 101410668 A | 4/2009 |
| JP | 2011-129277 A | 6/2011 |

(Continued)

OTHER PUBLICATIONS

Extended European Search Report for EP Patent Application No. 22931008.1 dated Apr. 9, 2025 (17 pages).

*Primary Examiner* — Gerald J Sufleta, II
(74) *Attorney, Agent, or Firm* — JCIPRNET

(57) ABSTRACT

A light diffusion sheet is incorporated in a backlight unit using a plurality of light sources arranged in a two-dimensional matrix. The light diffusion sheet has surfaces, on at least one of which a plurality of recesses having a substantially inverted quadrangular pyramid shape are arranged in a two-dimensional matrix. An intersecting angle between an arrangement direction of the plurality of recesses and an arrangement direction of the plurality of light sources is 30° or more and 60° or less.

11 Claims, 11 Drawing Sheets

(56)          References Cited

U.S. PATENT DOCUMENTS

| | | | |
|---|---|---|---|
| 2009/0103001 A1* | 4/2009 | Choi | G02F 1/133308 |
| | | | 349/58 |
| 2009/0262428 A1 | 10/2009 | Kurokawa | |
| 2009/0268430 A1 | 10/2009 | Suzuki et al. | |
| 2010/0124047 A1 | 5/2010 | Ahn | |
| 2012/0236556 A1 | 9/2012 | Yamaguchi et al. | |
| 2013/0271693 A1* | 10/2013 | Chen | G02F 1/133308 |
| | | | 349/58 |
| 2017/0146214 A1 | 5/2017 | Purchase | |
| 2020/0049876 A1 | 2/2020 | Watanabe et al. | |
| 2020/0174317 A1 | 6/2020 | Chang | |
| 2020/0292881 A1 | 9/2020 | Tsai | |
| 2021/0200002 A1 | 7/2021 | Kim | |
| 2023/0152626 A1 | 5/2023 | Nishikawa et al. | |

FOREIGN PATENT DOCUMENTS

| | | | |
|---|---|---|---|
| JP | 2012-043671 A | 3/2012 | |
| JP | 2012-234047 A | 11/2012 | |
| JP | 2022022964 | 2/2022 | |
| KR | 2011-0036937 A | 4/2011 | |
| KR | 2011-0036947 A | 4/2011 | |
| TW | 201024809 | 7/2010 | |
| WO | WO 2010/010840 A1 | 1/2010 | |

* cited by examiner

LIGHT DIFFUSION SHEET, BACK-LIGHT UNIT, LIQUID CRYSTAL DISPLAY DEVICE, INFORMATION APPARATUS, AND METHOD FOR MANUFACTURING BACK-LIGHT UNIT

CROSS REFERENCE TO RELATED APPLICATIONS

This application is a continuation of U.S. application Ser. No. 18/825,724, filed Sep. 5, 2024, which is a continuation of International Application No. PCT/JP2022/041405, filed Nov. 7, 2022, which claims priority to and the benefit of Japanese Application No. 2022-035936, filed Mar. 9, 2022; the contents of all of which are hereby incorporated by reference in their entirety.

BACKGROUND

The present disclosure relates to a light diffusion sheet, a backlight unit, a liquid crystal display device, an information apparatus, and a method for manufacturing the backlight unit.

Liquid crystal display devices (hereinafter referred to as liquid crystal displays in some cases) have been widely used as display devices for various information apparatuses such as smartphones and tablet terminals. A major type of a backlight of a liquid crystal display is an edge light type in which light sources are arranged near a side surface of a liquid crystal panel.

When the direct-type backlight is adopted, a light diffusion sheet is used to diffuse light emitted from a light source such as a light emitting diode (LED) to improve uniformity of luminance and chromaticity over the entire screen (e.g., see Japanese Unexamined Patent Publication No. 2011-129277).

A direct-type backlight unit for a thin display such as a laptop computer or a tablet computer is used with, e.g., a light diffusion sheet having two-dimensionally arranged recesses having an inverted pyramid shape.

BRIEF SUMMARY

However, traditional light diffusion sheets have not yet yielded sufficient luminance uniformity.

It is an object of the present disclosure to provide a light diffusion sheet that enables improvement in the luminance uniformity.

To achieve the above object, the light diffusion sheet of the present disclosure is a light diffusion sheet incorporated in a backlight unit using a plurality of light sources arranged in a two-dimensional matrix, wherein the light diffusion sheet has surfaces, on at least one of which a plurality of recesses having a substantially inverted quadrangular pyramid shape are arranged in a two-dimensional matrix, and an intersecting angle between an arrangement direction of the plurality of recesses and an arrangement direction of the plurality of light sources is 30° or more and 60° or less.

According to the light diffusion sheet of the present disclosure, the intersecting angle between the arrangement direction of the recesses and the arrangement direction of the light sources is set to 30° or more and 60° or less. Thus, the intensity of light emitted from the light diffusion sheet can be increased in the diagonal direction of the light source arrangement where the distance between the light sources is long and the luminance is likely to decrease (the direction inclined by 45° with respect to the arrangement direction of the light source). Therefore, the luminance uniformity can be improved.

In the present disclosure, the expression "the plurality of light sources are arranged in a two-dimensional matrix" encompasses "light source groups each consisting of several small light sources are arranged in a two-dimensional matrix," and in this case, the small light sources themselves constituting each light source group may not be arranged in a two-dimensional matrix.

In the light diffusion sheet of the present disclosure, if the intersecting angle is 35° or more and 55° or less, and more preferably 40° or more and 50° or less, the luminance uniformity can be further improved.

In the light diffusion sheet of the present disclosure, if the recesses are provided on the light emitting surface, the intensity of light emitted from the light diffusion sheet can be easily increased in the diagonal direction of the light source arrangement.

A backlight unit of the present disclosure is a backlight unit incorporated in a liquid crystal display device and leading light emitted from a plurality of light sources arranged in a two-dimensional matrix to a display screen. The backlight unit includes the light diffusion sheet of the present disclosure provided between the display screen and the plurality of light sources.

The backlight unit of the present disclosure includes the light diffusion sheet of the present disclosure, and thus the luminance uniformity can be improved.

If, in the backlight unit of the present disclosure, the light diffusion sheet includes a plurality of the light diffusion sheets, the plurality of the light diffusion sheets diffuse light repeatedly, and thus the luminance uniformity can be further improved.

The backlight unit of the present disclosure may further include a color conversion sheet provided between the display screen and the plurality of light sources and configured to convert a wavelength of light emitted from the plurality of light sources. Accordingly, even when the light sources are light sources other than white light sources, the backlight unit can be configured.

The backlight unit of the present disclosure may include a luminance enhancing sheet provided between the light diffusion sheet and the display screen and configured to enhance luminance of light emitted from the plurality of light sources. Accordingly, the luminance uniformity can be improved whereas the luminance can be increased.

In the backlight unit of the present disclosure, the plurality of light sources may be arranged on a reflection sheet provided opposite to the display screen when viewed from the light diffusion sheet. This causes multiple reflections between the light diffusion sheet and the reflection sheet thus causing further light diffusion, and thus the luminance uniformity is further improved.

A liquid crystal display device of the present disclosure includes the backlight unit of the present disclosure and a liquid crystal display panel.

The liquid crystal display device of the present disclosure includes the backlight unit of the present disclosure, and thus the luminance uniformity can be improved.

An information apparatus of the present disclosure includes the liquid crystal display device of the present disclosure.

The information apparatus of the present disclosure includes the liquid crystal display device of the present disclosure, and thus the luminance uniformity can be improved.

A method of the present disclosure for manufacturing a backlight unit is a method for manufacturing a backlight unit incorporated in a liquid crystal display device and leading light emitted from a plurality of light sources arranged in a two-dimensional matrix to a display screen, comprising: arranging the plurality of light sources; and arranging a light diffusion sheet having surfaces, on at least one of which a plurality of recesses having a substantially inverted quadrangular pyramid shape are arranged in a two-dimensional matrix, wherein the plurality of light sources and the light diffusion sheet are arranged so that an intersecting angle between an arrangement direction of the plurality of recesses and an arrangement direction of the plurality of light sources is 30° or more and 60° or less.

According to the method of the present disclosure for manufacturing the backlight unit, the intersecting angle between the arrangement direction of the recesses of the light diffusion sheet and the arrangement direction of the light sources is set to 30° or more and 60° or less. Thus, the intensity of light emitted from the light diffusion sheet can be increased in the diagonal direction of the light source arrangement where the distance between the light sources is long and the luminance is likely to decrease (the direction inclined by 45° with respect to the arrangement direction of the light source). Therefore, the luminance uniformity can be improved.

The present disclosure can provide a light diffusion sheet that enables improvement in the luminance uniformity.

DETAILED DESCRIPTION OF VARIOUS EMBODIMENTS

Embodiment

A light diffusion sheet, a backlight unit, a liquid crystal display device, an information apparatus, and a method for manufacturing the backlight unit of an embodiment will be described below with reference to the drawings. Note that the scope of the present disclosure is not limited to the following embodiments, and may be altered in any way within the scope of the technical concept of the present disclosure.

<Liquid Crystal Display Device>

Figure 1:
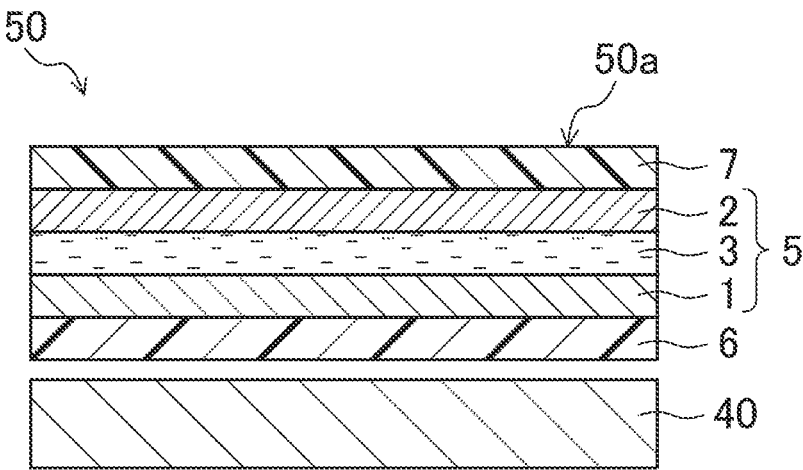
FIG. 1 is a cross-sectional view of a liquid crystal display device including a backlight unit of an embodiment.

As shown in FIG. 1, a liquid crystal display device 50 includes a liquid crystal display panel 5, a first polarizing plate 6 attached to a lower surface of the liquid crystal display panel 5, a second polarizing plate 7 attached to an upper surface of the liquid crystal display panel 5, and a backlight unit 40 provided on a back surface side of the liquid crystal display panel 5 with the first polarizing plate 6 sandwiched therebetween.

The liquid crystal display panel 5 includes a TFT substrate 1 and a CF substrate 2 provided so as to face each other, a liquid crystal layer 3 provided between the TFT substrate 1 and the CF substrate 2, and a sealing (not shown) provided in a frame shape to seal the liquid crystal layer 3 between the TFT substrate 1 and the CF substrate 2.

The shape of a display screen 50*a* of the liquid crystal display device 50 viewed from the front (the top in FIG. 1) is basically a rectangle or a square. Alternatively, the shape may be any shape such as a rectangle with rounded corners, an oval, a circle, a trapezoid, or the shape of an instrument panel of an automobile.

The liquid crystal display device 50 applies a voltage of a predetermined magnitude to the liquid crystal layer 3 in sub-pixels corresponding to pixel electrodes, thereby changing the alignment state of the liquid crystal layer 3. This adjusts the transmittance of light incident from the backlight unit 40 through the first polarizing plate 6. The light whose transmittance is adjusted is emitted through the second polarizing plate 7 to display an image.

The liquid crystal display device 50 of this embodiment is used as a display apparatus to be built in various information apparatuses (e.g., in-vehicle devices such as car navigation systems; personal computers; mobile phones; portable information equipment such as laptops and tablet computers; portable game machines; copying machines; ticket vending machines; automated teller machines; and the like).

The TFT substrate 1 includes, e.g., a plurality of TFTs arranged in a matrix on a glass substrate, an interlayer insulating film arranged in such a manner as to cover the TFTs, a plurality of pixel electrodes arranged in a matrix on the interlayer insulating film and connected to their respective TFTs, and an alignment film arranged in such a manner as to cover the pixel electrodes. The CF substrate 2 includes, e.g., a black matrix arranged in a lattice manner on a glass substrate, a color filter including a red layer, a green layer, and a blue layer arranged between lattices of the black matrix, a common electrode arranged in such a manner as to cover the black matrix and the color filter, and an alignment film arranged in such a manner as to cover the common electrode. The liquid crystal layer 3 is made of, e.g., a nematic liquid crystal material containing liquid crystal molecules having electro-optical characteristics. The first polarizing plate 6 and the second polarizing plate 7 each includes, e.g., a polarizer layer having a polarization axis in one direction, and a pair of protective layers arranged in such a manner as to sandwich the polarizer layer.

<Backlight Unit>

Figure 2:
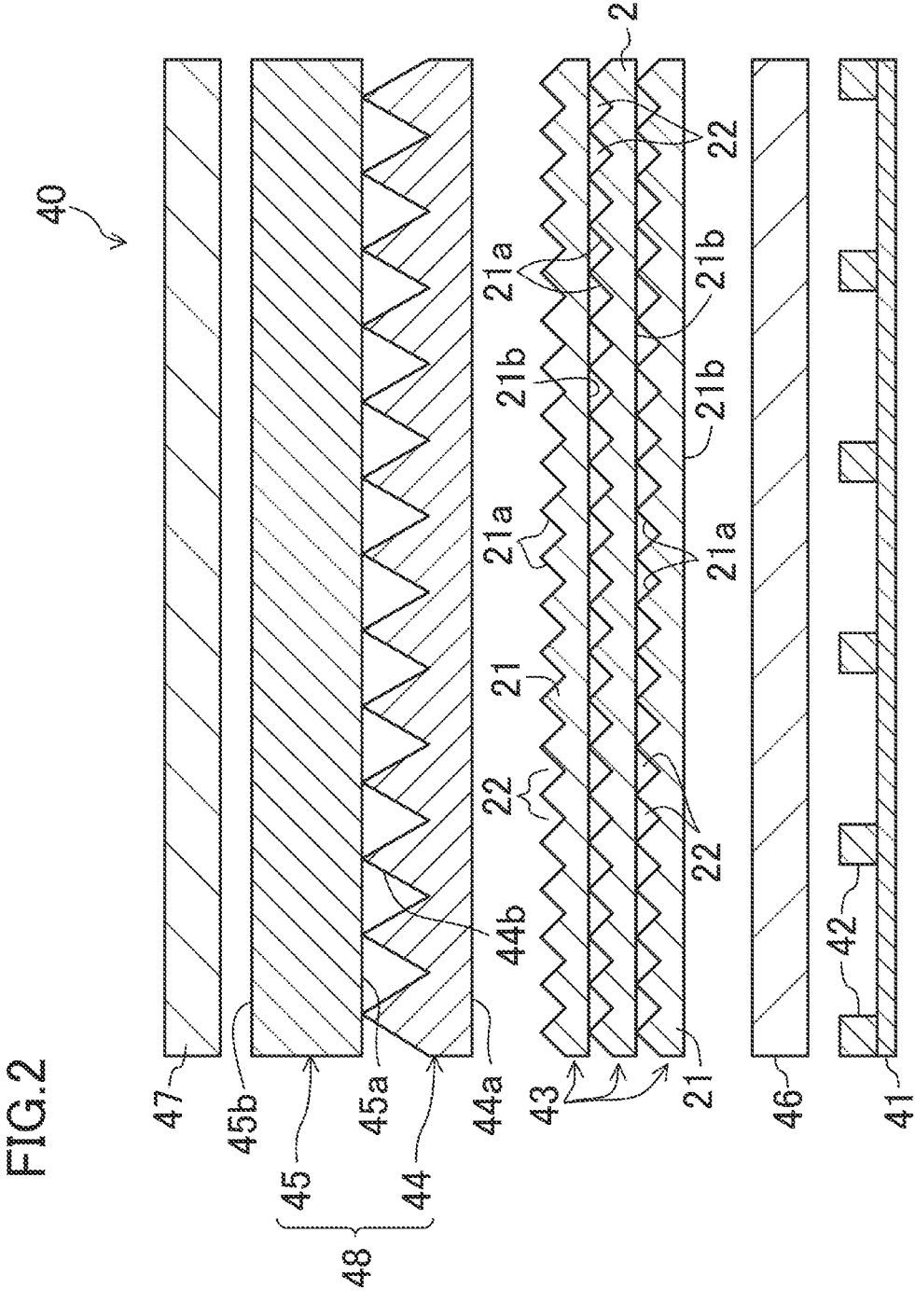
FIG. 2 is a cross-sectional view of a backlight unit incorporating a light diffusion sheet of the embodiment.

As shown in FIG. 2, the backlight unit 40 includes a reflection sheet 41, a plurality of light sources 42 arranged two-dimensionally on the reflection sheet 41, a light diffusion sheet 43 provided above the plurality of light sources 42, and a luminance enhancing sheet 48 provided above the light diffusion sheet 43 (or between the display screen 50a and the light diffusion sheet 43). In FIG. 2, the backlight unit 40 includes a color conversion sheet 46 arranged between the light sources 42 and the light diffusion sheet 43, and an upper light diffusion sheet 47 arranged above the luminance enhancing sheet 48 (or between the display screen 50a and the luminance enhancing sheet 48). The light diffusion sheet 43 will be described in detail later.

[Reflection Sheet]

The reflection sheet 41 is formed of, for example, a white polyethylene terephthalate resin film, a silver-deposited film, or the like.

[Light Source]

The type of the light sources 42 is not particularly limited. For example, an LED element, a laser element, or the like may be adopted, and an LED element may be adopted for the sake of costs, productivity, and the like. In order to adjust light emission angle characteristics of the LED element serving as the light source 42, a lens may be attached to the LED element. The light sources 42 may have a rectangular shape in a plan view, each side of which may be 10 μm or more (preferably 50 μm or more) and 10 mm or less (preferably 5 mm or less). The number of the light sources 42 is not limited, but preferably, to be distributed, the plurality of light sources 42 may be arranged regularly on the reflection sheet 41. The "arranged regularly" means arrangement with a certain regularity. For example, the light sources 42 may be arranged at equal intervals. If the light sources 42 are arranged at equal intervals, the distance between the centers of two adjacent small light sources 42 may be 0.5 mm or more (preferably 2 mm or more) and 20 mm or less.

Figure 3:
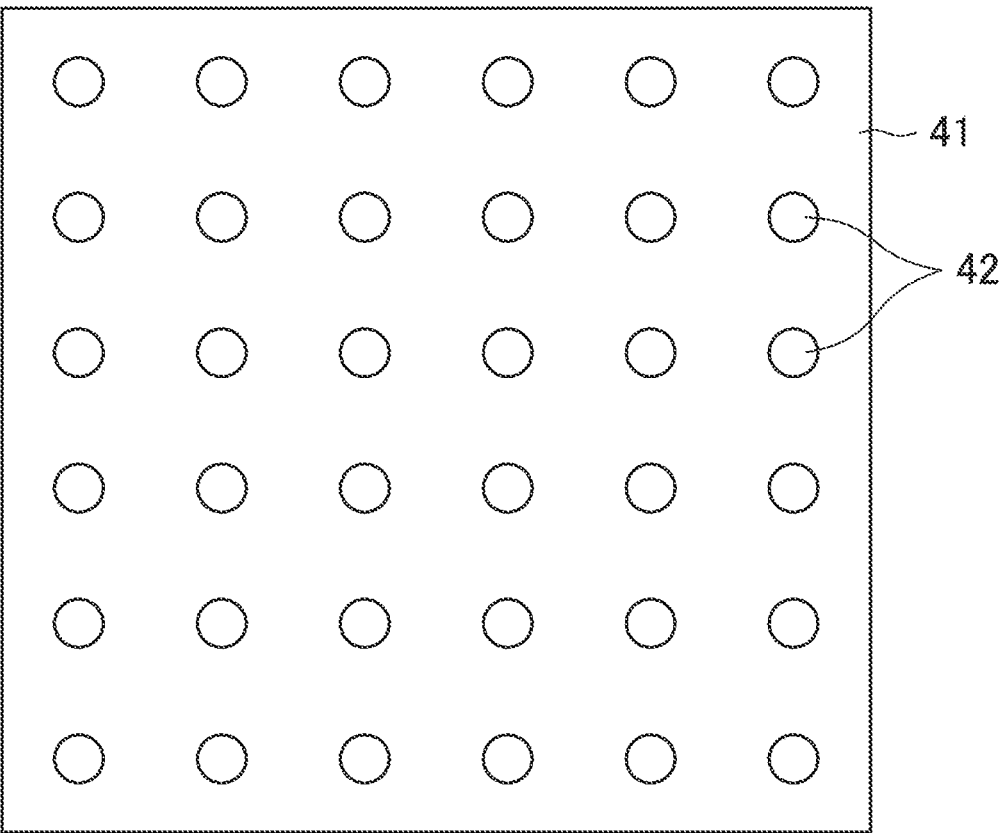
FIG. 3 is a plan view showing an exemplary arrangement of light sources in the backlight unit shown in FIG. 2.
Figure 3:
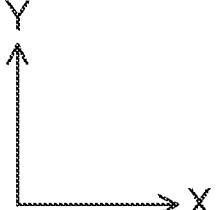

In this embodiment, as shown in FIG. 3 for example, the plurality of light sources 42 consisting of LED elements are arranged at regular intervals in a two-dimensional array with the X direction and the Y direction. In other words, the plurality of light sources 42 are arranged along the two directions (X direction and Y direction) perpendicular to each other. In this embodiment, the light sources 42 are blue light sources. The blue light sources may emit light of x<0.24 and y<0.18 in the CIE1931 color coordinates, for example. The light sources 42 may be white light sources. The white light sources may be configured by an LED element having the peak wavelength in a blue region, an LED element having the peak wavelength in a green region, and an LED element having the peak wavelength in a red region, and may emit light of 0.24<x<0.42 and 0.18<y<0.48 in the CIE1931 color coordinates, for example.

[Color Conversion Sheet]

The color conversion sheet 46 is a wavelength conversion sheet for converting light emitted from the light source 42 (e.g., a blue light source) into light having a wavelength of a certain color (e.g., green or red) as a peak wavelength. The color conversion sheet 46 converts, e.g., blue light with a wavelength of 450 nm into green light with a wavelength of 540 nm and red light with a wavelength of 650 nm. In this case, when the light source 42 emitting blue light with a wavelength of 450 nm is used, the color conversion sheet 46 partially converts blue light into green light and red light, and thus the light transmitted through the color conversion sheet 46 becomes white light. The color conversion sheet 46 may be, e.g., a quantum dot (QD) sheet, a fluorescent sheet, or the like.

When the light sources 42 are white light sources, the color conversion sheet 46 may be unnecessary. The arrangement of the color conversion sheet 46 is not particularly limited as long as it is arranged between the light source 42 and the luminance enhancing sheet 48 described later. For example, the color conversion sheet 46 may be arranged between the light diffusion sheet 43 and the luminance enhancing sheet 48.

[Luminance Enhancing Sheet]

The luminance enhancing sheet 47 has a structure having a lower prism sheet 44 and an upper prism sheet 45 layered in sequence from the side closer to the light source 42. The prism sheets 44 and 45, through which the light rays need to pass, are formed mainly of a transparent (e.g., colorless and transparent) synthetic resin. The prism sheets 44 and 45 may be integrated. The lower prism sheet 44 includes a base material layer 44a and an array of a plurality of prism projections 44b stacked on the surface of the base material layer 44a. Similarly, the upper prism sheet 45 includes a base material layer 45a and an array of a plurality of prism projections 45b stacked on the surface of the base material layer 45a. The prism projections 44b and 45b are stacked in a stripe pattern on the surfaces of the base material layers 44a and 45a, respectively. The prism projections 44b and 45b are triangular prisms and have back surfaces that are in contact with the surfaces of the base material layers 44a and 45a, respectively. The extending direction of the prism projections 44b and the extending direction of the prism projections 45b are perpendicular to each other. Accordingly, light rays incident from the light diffusion sheet 43 can be refracted in the normal direction by the lower prism sheet 44, and light rays emitted from the lower prism sheet 44 can be further refracted by the upper prism sheet 45 in a direction substantially perpendicular to the display screen 50a.

The lower limit of the thickness of the prism sheets 44 and 45 (the height from the back surface of the base material layer 44a and 45a to the apex of the prism projections 44b and 45b) may be, e.g., approximately 50 μm, and more preferably approximately 100 μm. The upper limit of the thickness of the prism sheets 44 and 45 may be, e.g., approximately 200 μm, and more preferably approximately 180 μm. The lower limit of the pitch of the prism projections 44b and 45b in the prism sheets 44 and 45 may be, e.g., approximately 20 μm, and more preferably approximately 25 μm. The upper limit of the pitch of the prism projections 44b and 45b in the prism sheets 44 and 45 may be, e.g., approximately 100 μm, and more preferably approximately 60 μm. The apex angle of the prism projections 44b and 45b may be, e.g., 85° or more and 95° or less. The lower limit of the refractive index of the prism projections 44b and 45b may be, e.g., 1.5, and more preferably 1.55. The upper limit of the refractive index of the prism projections 44b and 45b may be, e.g., 1.7.

The prism sheets 44 and 45 may include the base material layers 44a and 45a and the prism projections 44b and 45b, where the prism projections 44b and 45b to which the shape transfer is applied by using an UV curable acryl-based resin are provided on the base material layers 44a and 45a made of, e.g., a PET (polyethylene terephthalate) film, or where the prism projections 44b and 45b are integrated with the base material layers 44a and 45a, respectively.

In this embodiment, the prism sheets 44 and 45 are used as the luminance enhancing sheet 48, but may be replaced with other optical sheets capable of increasing the luminance of the light emitted from the light source 42.

[Upper Light Diffusion Sheet]

The upper light diffusion sheet 47 is arranged above the upper prism sheet 45 (or between the display screen 50a and the upper prism sheet 45). The upper light diffusion sheet 47 may have a double layer structure consisting of a base material layer and a light diffusion layer. Since the light rays need to pass through the base material layer, the base material layer may be formed mainly of a transparent (e.g., colorless and transparent) synthetic resin. The light diffusion layer may include a resin matrix and resin beads dispersed in the resin matrix.

[Other Optical Sheets]

Although not shown, a polarizing sheet may be provided above the upper light diffusion sheet 47 (or between the display screen 50a and the upper light diffusion sheet 47). The polarizing sheet improves the luminance of the display screen 50a by preventing light emitted from the backlight unit 40 from being absorbed by the first polarizing plate 6 of the liquid crystal display device 50.

[Light Diffusion Sheet]

Figure 4:
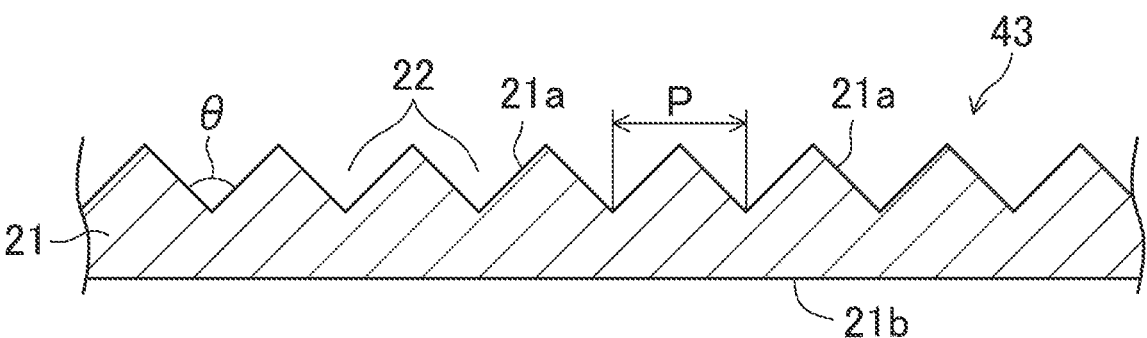
FIG. 4 is a cross-sectional view of the light diffusion sheet of the embodiment.

In FIG. 2, the backlight unit 40 is pvodied with, e.g., three light diffusion sheets 43 having the same structure and layered with each other. The light diffusion sheet 43 may include one light diffusion sheet, two light diffusion sheets layered with each other, or four or more light diffusion sheets layered with each other. The light diffusion sheet 43 includes a base material layer 21 as shown in FIG. 4. The light diffusion sheet 43 (base material layer 21) includes a first surface 21a as a light emitting surface and a second surface 21b as a light incident surface. That is, the light diffusion sheet 43 is arranged so that the second surface 21b faces the light sources 42. A resin for a matrix of the base material layer 21 is not particularly limited as long as being formed of a material that transmits light, and may be, e.g., acrylic, polystyrene, polycarbonate, methyl methacrylate/styrene copolymer (MS) resin, polyethylene terephthalate, polyethylene naphthalate, cellulose acetate, polyimide, or the like. The base material layer 21 may contain a diffusing agent or other additives, or may be substantially free of additives. The additives that the base material layer 21 can contain are not particularly limited, and may be inorganic particles such as silica, titanium oxide, aluminum hydroxide, barium sulfate, and the like, and may be organic particles such as acrylic, acrylonitrile, silicone, polystyrene, polyamide, and the like.

The thickness of the light diffusion sheet 43 is not limited, but may be, e.g., 3 mm or less (preferably 2 mm or less, more preferably 1.5 mm or less, and further more preferably 1 mm or less) and 50 μm or more. The light diffusion sheet 43 having a thickness of greater than 3 mm makes it difficult to reduce the thickness of the liquid crystal display. The light diffusion sheet 43 having a thickness of less than 50 μm makes it difficult to achieve the luminance uniformity. The light diffusion sheet 43 may have a film shape or a plate shape.

Figure 5:
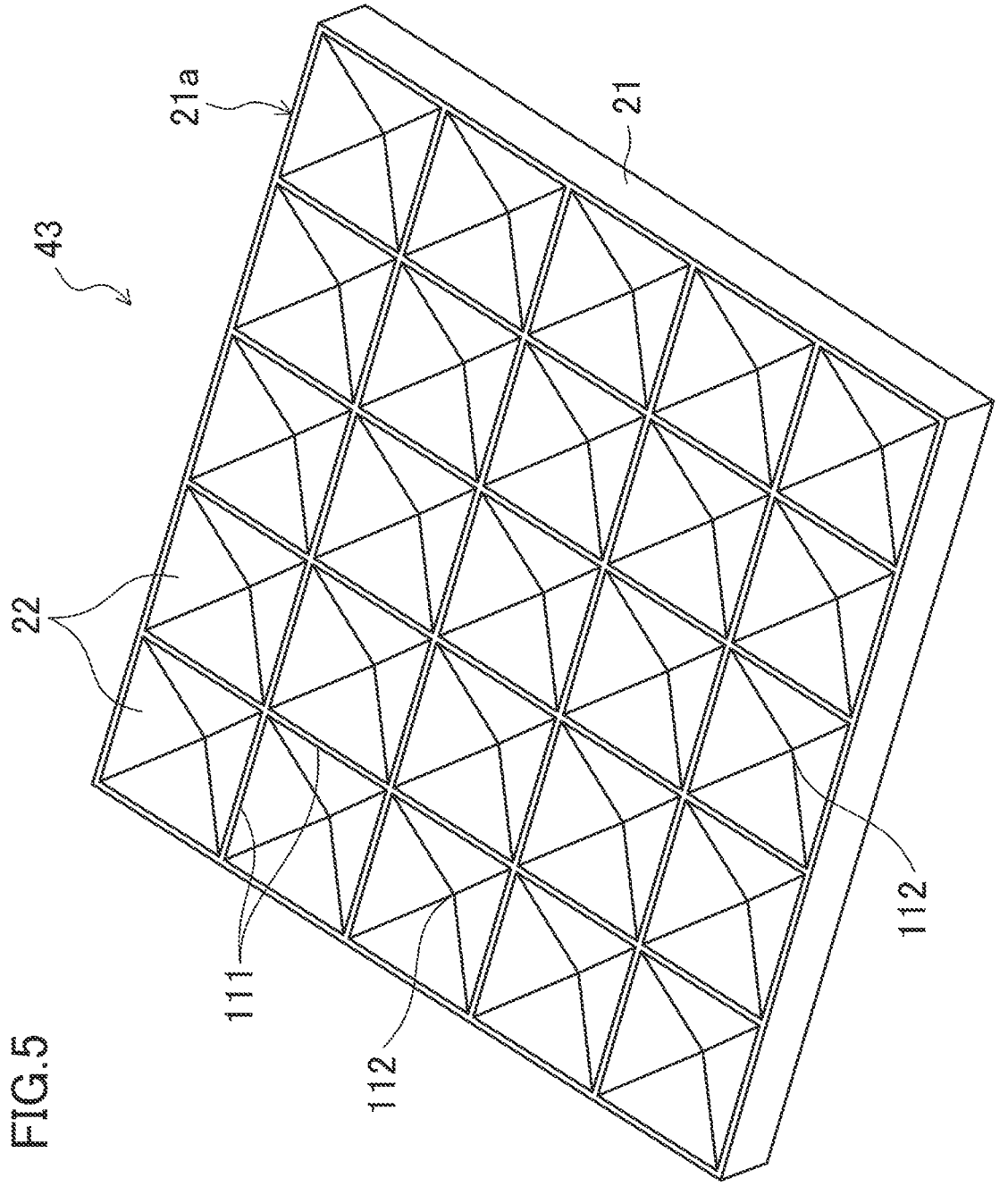
FIG. 5 is a perspective view of the light diffusion sheet of the embodiment.
Figure 6:
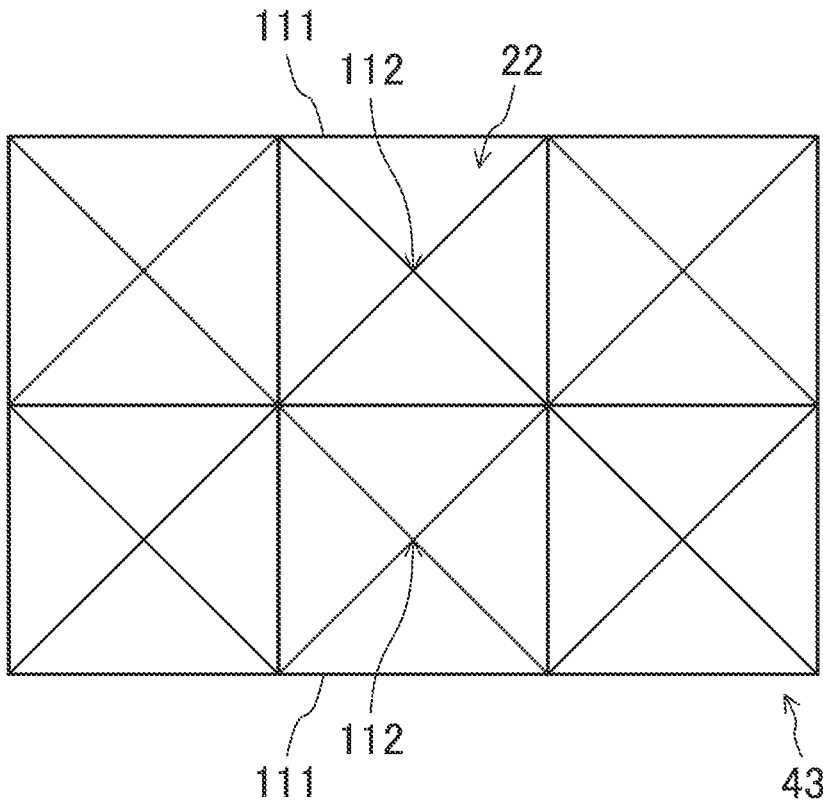
FIG. 6 is a plan view showing an exemplary arrangement of recesses in the light diffusion sheet of the embodiment.

On the first surface 21a (the light emitting surface) of the light diffusion sheet 43, a plurality of recesses 22 having a substantially inverted quadrangular pyramid shape (inverted pyramid shape) are arranged in a two-dimensional matrix as shown in FIG. 5. In other words, the plurality of recesses 22 are arranged along two directions (the X1 direction and the Y1 direction shown in FIG. 6) perpendicular to each other. The recesses 22 adjacent to each other are parted by a ridge 111. The ridge 111 extends along the two directions in which the recesses 22 are arranged. A center 112 (apex of the inverted pyramid) of the recess 22 is a deepest portion of the recess 22. FIG. 5 illustrates that the recesses 22 are arranged in a 5×5 matrix for simplicity, but the actual number of the recesses 22 is much larger. In a two-dimensional arrangement of the plurality of recesses 22, the recesses 22 may be arranged on the first surface 21a without a space therebetween, or may be arranged with a predetermined space therebetween. Some of the recesses 22 may be randomly arranged to the extent that the light diffusing effect is not lost.

The recess 22 may have an apex angle θ of, e.g., 90°. The recesses 22 may have an arrangement pitch p of, e.g., 100 μm. The recess 22 may have a depth of, e.g., 50 μm. The apex angle θ of the recess 22 is an angle formed by cross-sectional lines of a pair of inclined surfaces of the recess 22 which sandwich the center of the recess 22 and face each other, where the cross-sectional lines appear in a cross section when the recess 22 is cut by a plane (longitudinal cross-section) vertical to a plane on which the light diffusion sheet 43 is placed, such that the plane (longitudinal cross-section) passes through the center of the recess 22 (apex 112 of the inverted pyramid) and vertically traverses the pair of inclined surfaces of the recess 22. The arrangement pitch p of the recesses 22 means a distance between the centers of the recesses 22 (apexes of the inverted pyramids 112) adjacent to each other (i.e., distance in a direction parallel to the plane on which the light diffusion sheet 43 is placed).

The second surface 21b of the light diffusion sheet 43 may be, e.g., a flat surface (mirror surface) or an embossed surface.

The light diffusion sheet 43 may have a single layer structure consisting of the base material layer 21 with the first surface 21a having an uneven shape (recesses 22). The light diffusion sheet 43 may have a double layer structure consisting of a base material layer having two flat surfaces and a layer having one uneven surface. The light diffusion sheet 43 may have a triple or more layer structure including a layer having one uneven surface. The method for manufacturing the light diffusion sheet 43 is not particularly limited. For example, extrusion molding, injection molding, or the like may be employed.

A single layer light diffusion sheet having an uneven surface may be manufactured by extrusion molding as follows. First, plastic particles in the form of pellets (to which a diffusing agent may be added) are introduced into a single-screw extruder, and molten and kneaded by heating. After that, a molten resin extruded from a T-die is sandwiched and cooled between two metal rolls, then transported by guide rolls, and cut off into sheet plates by a sheet cutter machine to produce light diffusion sheets. Here, the molten resin is sandwiched using the metal roll having a surface with an inverted shape of desired unevenness, whereby the inverted shape of the roll surface will be transferred onto the resin. This allows for shaping of diffusion sheets having surfaces with the desired unevenness. The surface shapes of the rolls are not perfectly transferred onto the resin, and thus may be designed in consideration of how completely the shapes are transferred.

If a two-layered light diffusion sheet with uneven surfaces is manufactured by extrusion molding, for example, plastic particles as pellets necessary for forming each layer may be introduced into each of two single-screw extruders. Then, the same procedure may be performed for each layer, and the fabricated sheets may be layered.

Alternatively, the two-layered light diffusion sheet with an uneven surface may be manufactured as follows. First, plastic particles as pellets necessary for forming each layer are introduced into each of two single-screw extruders, and molten and kneaded by heating. Then, molten resins formed into each layer are introduced into a single T-die so that molten resins are layered in the T-die. Then, the layered molten resins extruded from the T-die are sandwiched and cooled between two metal rolls. After that, the layered molten resins are transported by guide rolls, and cut off into sheet plates using a sheet cutter machine, thus yielding a two-layered light diffusion sheet with an uneven surface.

The light diffusion sheet may be manufactured by shape-transfer using ultraviolet (UV) as follows. First, an uncured ultraviolet curable resin is filled in a roll having an inverted shape of an uneven shape to be transferred, and a base material is pressed onto the resin. Next, with the roll filled with UV-curing resin being integrated with the base material, the resin is cured by UV irradiation. Next, the sheet to which the shape of the uneven surface has been transferred by using the resin is released from the roll. Finally, the sheet is irradiated with ultraviolet rays again to completely cure the resin, thereby producing a light diffusion sheet having an uneven surface.

In the present disclosure, the term "substantially inverted quadrangular pyramid" is used in consideration of difficulty in formation of a recess having a geometrically exact inverted quadrangular pyramid shape by an ordinary shape transfer technique. However, the "substantially inverted quadrangular pyramid" encompasses shapes that can be regarded as a true or approximately inverted quadrangular pyramid. Further, "substantial(ly)" XX means that shapes can be approximated to the XX, and "substantially inverted quadrangular pyramids" means shapes that can be approximated to the inverted quadrangular pyramids. For example, the "substantially inverted quadrangular pyramid" includes an "inverted truncated quadrangular pyramid" which has a flat apex and of which the area of the apex is so small that the advantages of the present invention are not lost. The "substantially inverted quadrangular pyramid" also includes a deformation of "inverted quadrangular pyramid" with unavoidable shape variations due to the processing accuracy of industrial production.

<Features of Embodiment>

The light diffusion sheet 43 of this embodiment is incorporated in the backlight unit 40 using the plurality of light sources 42 arranged in a two-dimensional matrix. The light diffusion sheet 43 has surfaces, on at least one of which the plurality of recesses 22 having a substantially inverted quadrangular pyramid shape are arranged in a two-dimensional matrix. The intersecting angle between the arrangement direction of the plurality of recesses 22 (the X1 direction and the Y1 direction in FIG. 6) and the arrangement direction of the plurality of light sources 42 (the X direction and the Y direction in FIG. 3) is 30° or more and 60° or less.

According to the light diffusion sheet 43 of this embodiment, the intersecting angle between the arrangement direction of the recesses 22 and the arrangement direction of the light sources 42 is set to 30° or more and 60° or less. Thus, the intensity of light emitted from the light diffusion sheet 43 can be increased in the diagonal direction of the light source arrangement where the distance between the light sources is long and the luminance is likely to decrease (the direction inclined by 45° with respect to the arrangement direction of the light source 42). Therefore, the luminance uniformity can be improved. In this embodiment, the expression "the plurality of light sources 42 are arranged in a two-dimensional matrix" encompasses "light source groups each consisting of several small light sources are arranged in a two-dimensional matrix," and in this case, the small light sources themselves constituting each light source group may not be arranged in a two-dimensional matrix.

In the light diffusion sheet 43 of this embodiment, if the intersecting angle between the arrangement direction of the recesses 22 and the arrangement direction of the light sources 42 is 35° or more and 55° or less, and more preferably 40° or more and 50° or less, the luminance uniformity can be further improved.

In the light diffusion sheet 43 of this embodiment, if the recesses 22 are provided on the light emitting surface, the intensity of light emitted from the light diffusion sheet 43 can be easily increased in the diagonal direction of the light source arrangement.

The backlight unit 40 of this embodiment is incorporated in the liquid crystal display device 50, and leads light emitted from the plurality of light sources 42 arranged in a two-dimensional matrix to the display screen 50a. The backlight unit 40 includes the light diffusion sheet 43 of the above embodiment between the display screen 50a and the plurality of light sources 42.

The backlight unit 40 of this embodiment includes the light diffusion sheet 43 of this embodiment, and thus the luminance uniformity can be improved.

If, in the backlight unit 40 of this embodiment, the light diffusion sheet 43 includes a plurality of the light diffusion sheets 43, the plurality of the light diffusion sheets 43 diffuse light repeatedly, and thus the luminance uniformity can be further improved. In this case, in at least one of the plurality of light diffusion sheets 43, the intersecting angle between the arrangement direction of the recesses 22 and the arrangement direction of the light sources 42 is 30° or more and 60° or less.

The backlight unit 40 of this embodiment may further include a color conversion sheet 46 provided between the display screen 50a and the plurality of light sources 42 and configured to convert the wavelength of light emitted from the light sources 42. Accordingly, even when the light sources 42 are light sources other than white light sources, the backlight unit 40 can be configured.

The backlight unit 40 of this embodiment may include a luminance enhancing sheet 48 provided between the light diffusion sheet 43 and the display screen 50a and configured to enhance the luminance of the light emitted from the light sources 42. Accordingly, the luminance uniformity can be improved whereas the luminance can be increased.

In the backlight unit 40 of this embodiment, the plurality of light sources 42 may be arranged on the reflection sheet 41 provided on the opposite side of the display screen 50a when viewed from the light diffusion sheet 43. This causes multiple reflections between the light diffusion sheet 43 and the reflection sheet 41 thus causing further light diffusion, and thus the luminance uniformity is further improved.

In the backlight unit 40 of this embodiment, when the distance between the light sources 42 and the light diffusion sheet 43 is 5 mm or less, the backlight unit 40 can be downsized. In anticipation of the future reduction in thicknesses of medium-to-small-sized liquid crystal displays, the distance between the light sources 42 and the light diffusion sheet 43 may be preferably 2.5 mm or less, more preferably 1 mm or less, and ultimately 0 mm.

The liquid crystal display device 50 of this embodiment includes the backlight unit 40 of the above embodiment and the liquid crystal display panel 5. Therefore, the backlight unit 40 can improve the luminance uniformity. Information apparatuses (e.g., portable information equipment such as laptop computers, tablet computers, and the like) incorporating the liquid crystal display device 50 can also achieve the similar advantages.

A method of this embodiment for manufacturing a backlight unit 40 includes arranging a plurality of light sources 42, and arranging a light diffusion sheet 43 having surfaces, on at least one of which a plurality of recesses 22 having a substantially inverted quadrangular pyramid shape are arranged in a two-dimensional matrix, wherein the plurality of light sources 42 and the light diffusion sheet 43 are arranged so that the intersecting angle between the arrangement direction of the plurality of recesses 22 and the arrangement direction of the plurality of light sources 42 is 30° or more and 60° or less.

According to the method of this embodiment for manufacturing the backlight unit 40, the intersecting angle between the arrangement direction of the recesses 22 of the light diffusion sheet 43 and the arrangement direction of the light sources 42 is set to 30° or more and 60° or less. Thus, the intensity of light emitted from the light diffusion sheet 43 can be increased in the diagonal direction of the light source arrangement where the distance between the light sources is long and the luminance is likely to decrease. Therefore, the luminance uniformity can be improved.

EXAMPLE

An example will be described below.

In an example, as shown in FIG. 2, three light diffusion sheets 43 each having the same structure with a thickness of 110 μm were layered in the direction in which recesses 22 were arranged on a light emitting surface (first surface 21*a*). Above the light diffusion sheets 43, a lower prism sheet 44, an upper prism sheet 45, and an upper light diffusion sheet 47 were arranged in sequence, where the lower prism sheet 44 and the upper prism sheet 45 had prism extending directions perpendicular to each other. Below the light diffusion sheets 43, a color conversion sheet 46, which was a QD sheet, was arranged.

The light diffusion sheets 43 had the recesses 22 having an inverted pyramid shape with an apex angle of 90° and arranged two-dimensionally at a pitch of 100 μm. The light diffusion sheet 43 had a light incident surface (second surface 21*b*) as a flat surface.

The prism sheets 44 and 45 including base material layers 44*a* and 45*a* made of a PET film and prism projections 44*b* and 45*b* were formed, where the prism projections 44*b* and 45*b* were provided on the base material layers 44*a* and 45*a* by using an UV-curable acryl-based resin made from acrylate. The lower prism sheet 44 had a total thickness of 90 μm, and had the prism projections 44*b* having a height of 12 μm and an apex angle of 90° and arranged at a pitch of 24 μm. The upper prism sheet 45 had a total thickness of 155 μm, and had the prism projections 45*b* having a height of 25 μm and an apex angle of 90° and arranged at a pitch of 50 μm.

Note that, as the plurality of light sources 42, an LED array including blue LEDs having a peak wavelength of 450 nm (full width at half maximum: 16 nm) and arranged two-dimensionally at a pitch of 2.8 mm was used.

As described below, the luminance uniformity was examined with variation in the intersecting angle between the arrangement direction of the recesses 22 in the light diffusion sheet 43 of the example and the arrangement direction of the plurality of light sources 42.

Figure 7:
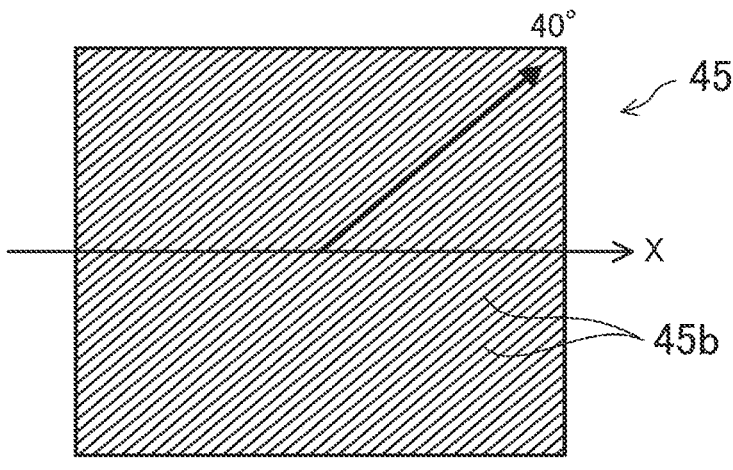
FIG. 7 is a diagram showing a relationship between an arrangement angle of the light diffusion sheet of the embodiment and an arrangement angle of a prism sheet.
Figure 7:
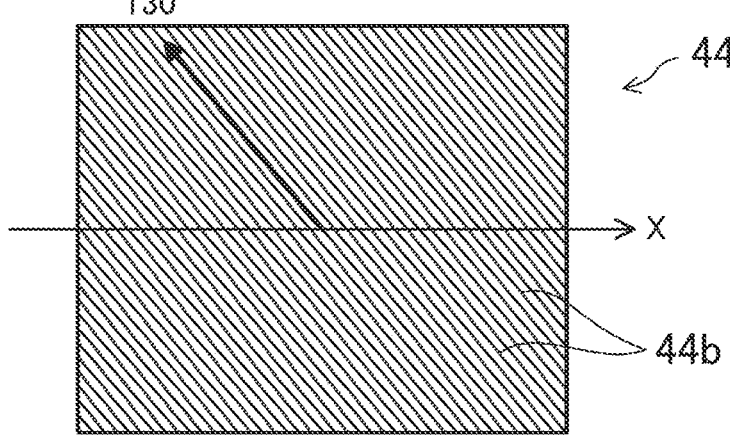
Figure 7:
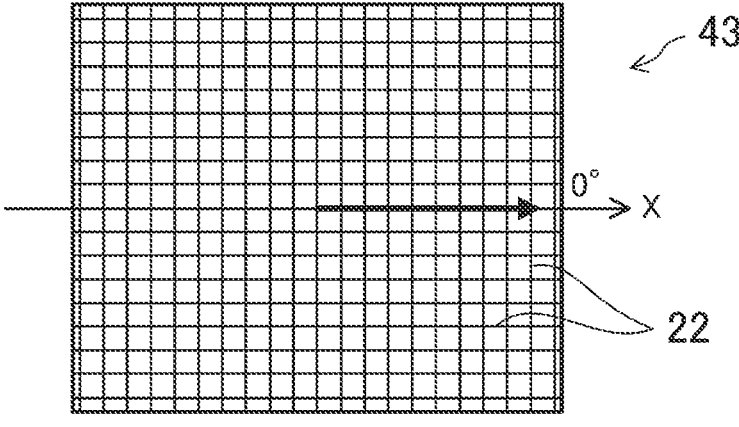

As shown in FIG. 7, in an initial state for the luminance measurement, the light diffusion sheet 43 was arranged so that one of the arrangement directions of the recesses 22 coincided with a reference direction (arrangement direction of the light sources 42 (X direction)) (i.e., arrangement angle of 0°); the lower prism sheet 44 was rotated counterclockwise so that the angle formed by the extending direction of the prism projections 44*b* with respect to the X direction was 130° (i.e., arrangement angle of 130°); and the upper prism sheet 45 was rotated counterclockwise so that the angle formed by the extending direction of the prism projections 45*b* with respect to the X direction was 40° (i.e., arrangement angle of 40°).

In a first measurement, the arrangement direction (arrangement angle) of the three light diffusion sheets 43 was rotated counterclockwise from the initial state by 10° each time and 90° in total in order to examine change in the luminance uniformity. The luminance uniformity was evaluated as follows. First, above the plurality of light sources 42 (LED array), as described above, the color conversion sheet 46, the three light diffusion sheets 43, the prism sheets 44 and 45, and the upper light diffusion sheet 47 were arranged in sequence, and a transparent glass plate was further placed thereabove to reduce floating of the sheets. Then, a two-dimensional color luminance meter UA-200 manufactured by Topcon Technohouse Corporation was used to measure the luminance in the vertically upward direction (i.e., in the direction from the LED array toward the glass plate). Next, for two-dimensional luminance distribution images obtained, variation in the light emitting intensity of individual LEDs was corrected and filtering process was conducted to reduce noises of bright/dark spots attributed to foreign materials and the like. Then, average and standard deviation were calculated for the luminance of all the pixels. Finally, the luminance uniformity was calculated with the "luminance uniformity" defined as "average value of luminance/standard deviation of luminance."

Figure 8:
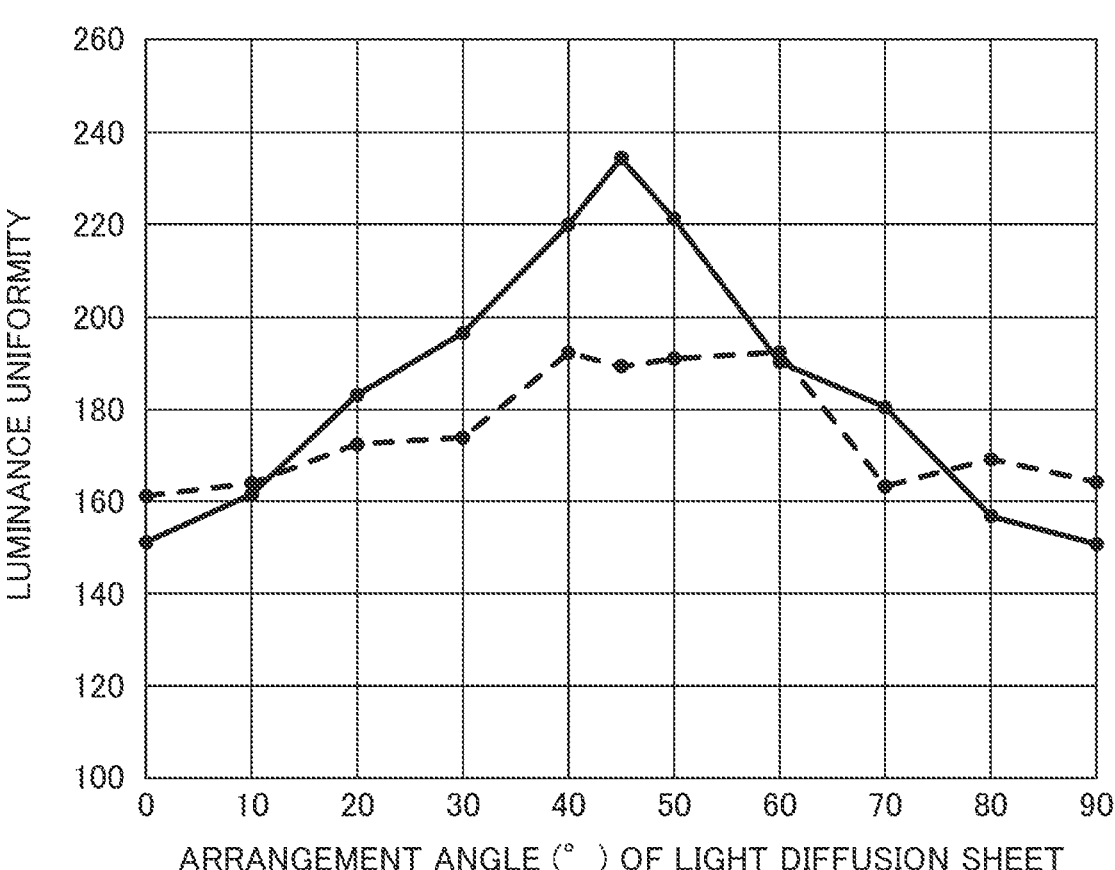
FIG. 8 shows change in the luminance uniformity with variation in the arrangement angle of the light diffusion sheet of the embodiment.

FIG. 8 shows the change in luminance uniformity obtained in the first measurement (solid line). In FIG. 8, as the light diffusion sheet 43 rotates, the "arrangement angle" increases from 0° to 90° by 10° each time, and the light diffusion sheet 43 has the equivalent arrangement at arrangement angles of 0° (180°) and 90° (270°). Thus, the "arrangement angle" other than 0° to 90° can be converted into the "arrangement angle" of 0° to 90° by addition or subtraction of a multiple of 90°. The "arrangement angle" converted in this way is equal to the intersecting angle between the arrangement direction of the recesses 22 of the light diffusion sheet 43 and the arrangement direction of the light sources 42 (hereinafter simply referred to as "intersecting angle" in some cases).

As shown in FIG. 8, it can be found that in order to improve the luminance uniformity, the arrangement angle of the light diffusion sheet 43, that is, the intersecting angle between the arrangement direction of the recesses 22 and the arrangement direction of the light sources 42 may be set to 30° or more and 60° or less, preferably 35° or more and 55° or less, and more preferably 40° or more and 50° or less. In order to examine the influence of the arrangement angles of the prism sheets 44 and 45 in the first measurement, the same measurement as the first measurement was performed with the arrangement angle of the lower prism sheet 44 set to 90° and the arrangement angle of the upper prism sheet 45 set to 0°. Then, the same correlation as the correlation of the first measurement was found between the luminance uniformity and the intersecting angle (see the dashed line in FIG. 8).

Next, in a second measurement, the arrangement directions (arrangement angles) of the three light diffusion sheets 43 were fixed to 45° and 0°, respectively, and the prism sheets 44 and 45 were rotated in order to examine change in the luminance uniformity. The method for evaluating the luminance uniformity was the same as in the first measurement.

Figure 9:
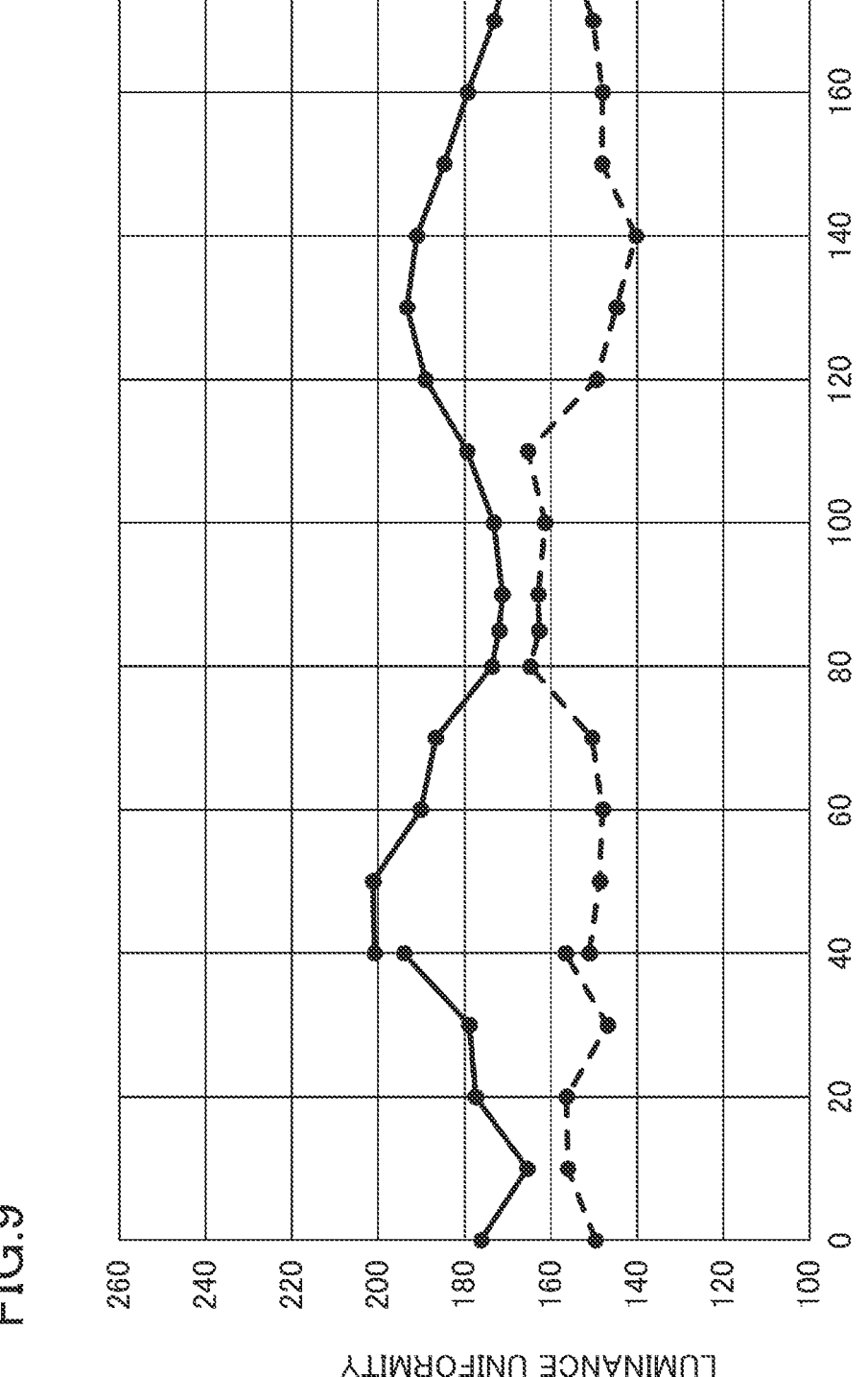
FIG. 9 shows change in the luminance uniformity with variation in the arrangement angle of the prism sheet with the arrangement angle of the light diffusion sheet of the embodiment being fixed to 45° and 0°.

FIG. 9 shows the change in the luminance uniformity obtained in the second measurement. In FIG. 9, the solid line represents the result obtained when the arrangement angle of the light diffusion sheet 43 was set to 45°, and the dashed line represents the result obtained when the arrangement angle of the light diffusion sheet 43 was set to 0°, respectively. The horizontal axis in FIG. 9 represents the arrangement angle of the upper prism sheet 45 (the rotation angle of the extending direction of the prism projections 45*b* (ridges) with respect to the arrangement direction (X direction) of the light sources 42), whereas the arrangement angle of the lower prism sheet 44 (the rotation angle of the extending direction of the prism projections 44*b* (ridges) with respect to the arrangement direction (X direction) of the light sources 42) is "the arrangement angle of the upper prism sheet 45"+90°.

As shown in FIG. 9, the luminance uniformity was higher at all arrangement angles of the prism sheets 44 and 45 when the arrangement angle (i.e., the intersecting angle) of the light diffusion sheet 43 was set to 45° than when the arrangement angle of the diffusion sheet 43 was set to 0°. Specifically, when the intersecting angle was set to 45°, the luminance uniformity is improved by approximately three times the variation range dependent on the arrangement angles of the prism sheets 44 and 45.

Next, in a third measurement, the arrangement directions (arrangement angles) of the three light diffusion sheets 43 were rotated together with the prism sheets 44 and 45 counterclockwise from the initial state by 10° each time and 180° in total in order to examine change in the luminance uniformity. The method for evaluating the luminance uniformity was the same as in the first measurement.

Figure 10:
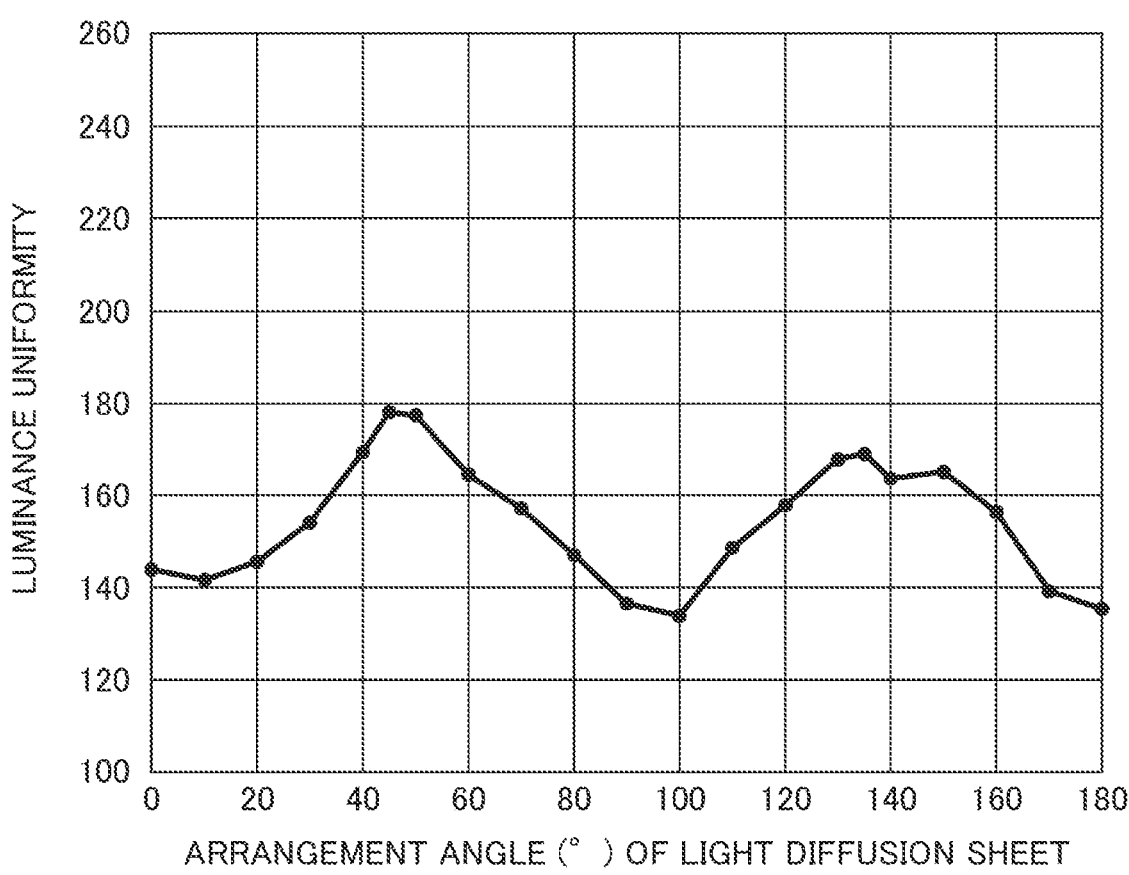
FIG. 10 shows change in the luminance uniformity with variation in the arrangement angle of the light diffusion sheet of the embodiment together with variation in the arrangement angle of the prism sheet.

FIG. 10 shows the change in the luminance uniformity obtained in the third measurement. As shown in FIG. 10, it has been found as in the result of the first measurement that also when the light diffusion sheet 43 is rotated together with the prism sheets 44 and 45 with respect to the arrangement direction of the light sources 42, the luminance uniformity is improved when the arrangement angle (i.e., the intersecting angle) of the light diffusion sheet 43 is 30° or more and 60° or less, preferably 35° or more and 55° or less, and more preferably 40° or more and 50° or less.

Next, in a fourth measurement, the arrangement direction (arrangement angle) of each one of the three light diffusion sheets 43 was set to 0° or 45° in order to examine change in the luminance uniformity. The method for evaluating the luminance uniformity was the same as in the first measurement.

Figure 11:
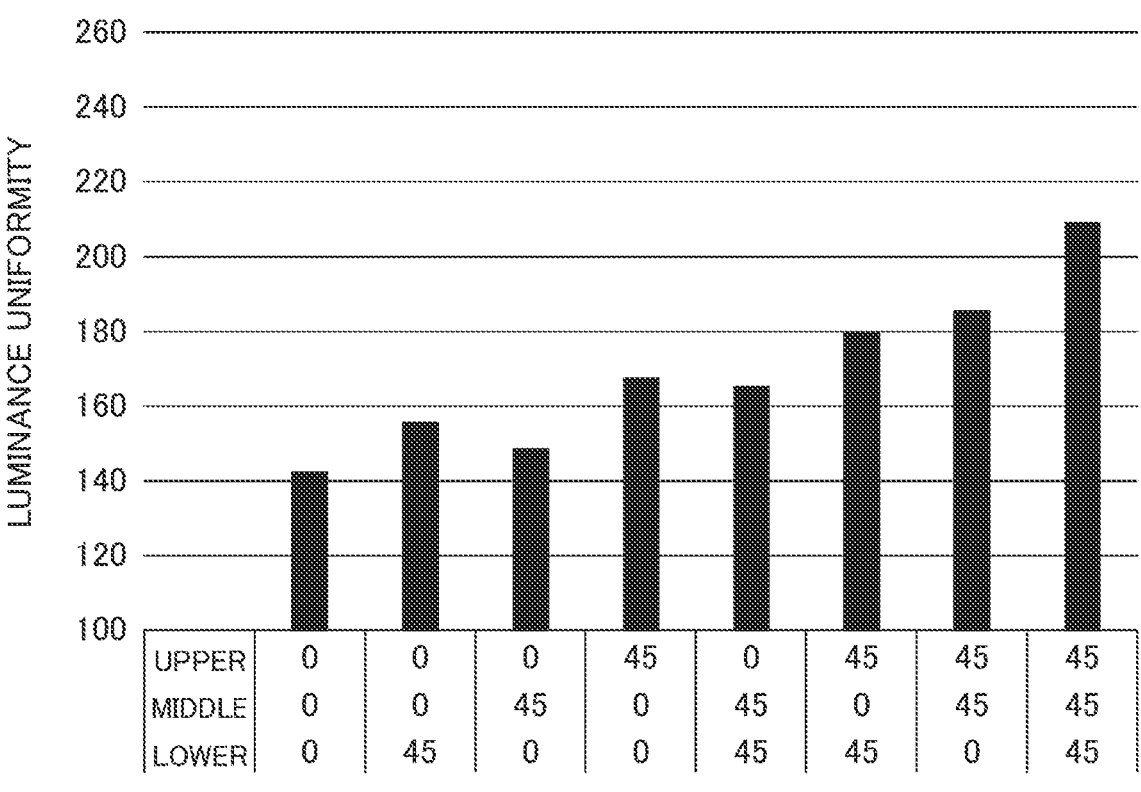
FIG. 11 shows the luminance uniformity where the light diffusion sheet of the embodiment includes three light diffusion sheets which have various arrangement angles.

FIG. 11 shows the luminance uniformity obtained in the fourth measurement. In FIG. 11, the terms "upper", "middle", and "lower" on the horizontal axis refer to the uppermost sheet, the second sheet, and the lowermost sheet of the three light diffusion sheets 43, respectively. As shown in FIG. 11, the more of the light diffusion sheets 43 had the arrangement angle (i.e., the intersecting angle) of 45°, the higher the luminance uniformity became. When one or two of the light diffusion sheets 43 had the arrangement angle (i.e., the intersecting angle) of 45°, the luminance uniformity of which the one or two of light diffusion sheets 43 was/were arranged in a higher level became higher.

Other Embodiments

In the above embodiment (including the example: the same applies hereinafter), the color conversion sheet 46, the light diffusion sheet 43, the luminance enhancing sheet 48, and the upper light diffusion sheet 47 constituted the backlight unit 40. However, the configuration (the type, the arrangement sequence, and the like) of the sheets constituting the backlight unit 40 is not particularly limited.

In the above embodiment, the second surface 21*b* of the light diffusion sheet 43 is either a flat surface (mirror surface) or an embossed surface. Alternatively, the second surface 21*b* of the light diffusion sheet 43 may be provided with recesses having an inverted polygonal pyramid shape and capable of being arranged two-dimensionally, or an array of projections such as prism projections.

The above describes the embodiments of the present disclosure. However, the present disclosure is not limited only to the aforementioned embodiments, and various modifications are possible within the scope of the disclosure. That is, the above description of the embodiments is solely to serve as an example in nature, and is not intended to limit the present disclosure, applications thereof, or uses thereof.

The invention claimed is:

1. A light diffusion sheet capable of being incorporated into a backlight unit using a plurality of light sources arranged in a two-dimensional matrix, the light diffusion sheet comprising:

surfaces on at least one of which a plurality of recesses having a substantially inverted quadrangular pyramid shape are arranged in a two-dimensional matrix, wherein an intersecting angle between an arrangement direction of the plurality of recesses and an arrangement direction of the plurality of light sources is 30° or more and 60° or less;

wherein the light diffusion sheet has a luminance uniformity of 150 or more, the luminance uniformity determined based on an average value of luminance divided by a standard deviation of luminance.

2. The light diffusion sheet of claim 1, wherein the intersecting angle is 35° or more and 55° or less.

3. The light diffusion sheet of claim 1, wherein the plurality of recesses are provided on a light emitting surface.

4. A backlight unit incorporated in a liquid crystal display device and leading light emitted from a plurality of light sources arranged in a two-dimensional matrix to a display screen, comprising:

the light diffusion sheet of claim 1 provided between the display screen and the plurality of light sources.

5. The backlight unit of claim 4, wherein the light diffusion sheet includes a plurality of the light diffusion sheets.

6. The backlight unit of claim 4, comprising:

a color conversion sheet provided between the display screen and the plurality of light sources and configured to convert a wavelength of light emitted from the plurality of light sources.

7. The backlight unit of claim 4, comprising:

a luminance enhancing sheet provided between the light diffusion sheet and the display screen and configured to enhance luminance of light emitted from the plurality of light sources.

8. The backlight unit of claim 4, wherein the plurality of light sources are arranged on a reflection sheet provided opposite to the display screen when viewed from the light diffusion sheet.

9. A liquid crystal display device, comprising:

the backlight unit of claim 4; and a liquid crystal display panel.

10. An information apparatus comprising the liquid crystal display device of claim 9.

11. A method for manufacturing a backlight unit incorporated in a liquid crystal display device and leading light emitted from a plurality of light sources arranged in a two-dimensional matrix to a display screen, comprising:

US 12,625,401 B2

15 arranging the plurality of light sources; and arranging a light diffusion sheet having surfaces, on at least one of which a plurality of recesses having a substantially inverted quadrangular pyramid shape are arranged in a two-dimensional matrix, wherein the plurality of light sources and the light diffusion sheet are arranged so that an intersecting angle between an arrangement direction of the plurality of recesses and an arrangement direction of the plurality of light sources is 30° or more and 60° or less, wherein the light diffusion sheet has a luminance uniformity of 150 or more, the luminance uniformity determined based on an average value of luminance divided by a standard deviation of luminance.

* * * * *

16